(12) United States Patent
Kim et al.

(10) Patent No.: US 8,180,405 B2
(45) Date of Patent: May 15, 2012

(54) MOBILE TERMINAL AND OPERATION CONTROL METHOD THEREOF

(75) Inventors: Jong Hwan Kim, Seoul (KR); Duck Moon Shin, Seoul (KR); June Choe, Seoul (KR); Jae Hoon Lee, Seoul (KR); Ung Je Jo, Seoul (KR); Min Woo Kim, Seoul (KR); Jeong Hyuk Yoon, Seoul (KR); Ho Young Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 12/457,103

(22) Filed: Jun. 1, 2009

(65) Prior Publication Data

US 2010/0227640 A1 Sep. 9, 2010

(30) Foreign Application Priority Data

Mar. 3, 2009 (KR) .................. 10-2009-0018107

(51) Int. Cl.
*H04M 1/00* (2006.01)

(52) U.S. Cl. ............... 455/566; 455/550.1; 345/156; 345/173

(58) Field of Classification Search ............. 455/550.1, 455/566; 345/156, 173
See application file for complete search history.

(56) References Cited

U.S. PATENT DOCUMENTS

| | | | |
|---|---|---|---|
| 2002/0177471 A1* | 11/2002 | Kaaresoja et al. | 455/567 |
| 2006/0145944 A1* | 7/2006 | Tarlton et al. | 345/2.3 |
| 2008/0218490 A1* | 9/2008 | Kim et al. | 345/173 |
| 2009/0156179 A1* | 6/2009 | Hahn et al. | 455/414.1 |

* cited by examiner

*Primary Examiner* — Lester Kincaid
*Assistant Examiner* — Steven Kelley
(74) *Attorney, Agent, or Firm* — Birch, Stewart, Kolasch & Birch, LLP

(57) ABSTRACT

A method of controlling a mobile terminal, and which includes receiving an blow signal corresponding to a blowing action into a microphone of the mobile terminal, and generating at least one of a visual effect and a vibration effect based on characteristics of the blow signal.

24 Claims, 16 Drawing Sheets

(a)

(b)

FIG. 8
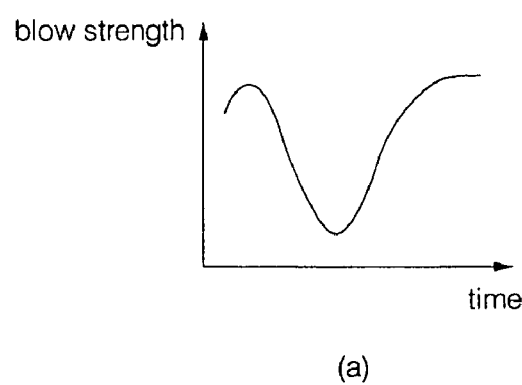
(a)
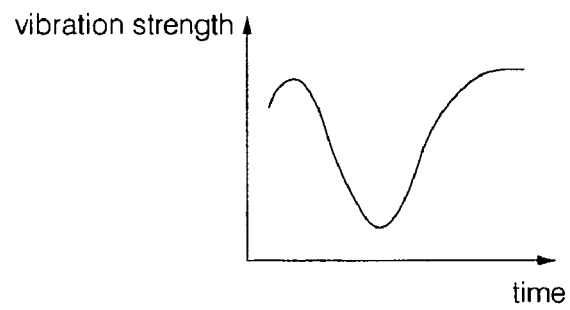
(b)

FIG. 9
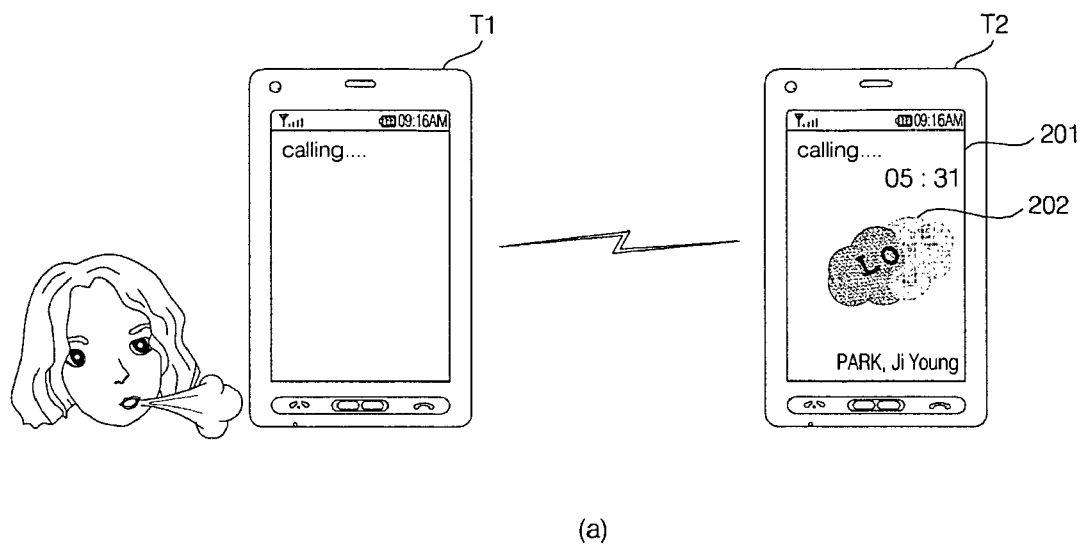
(a)
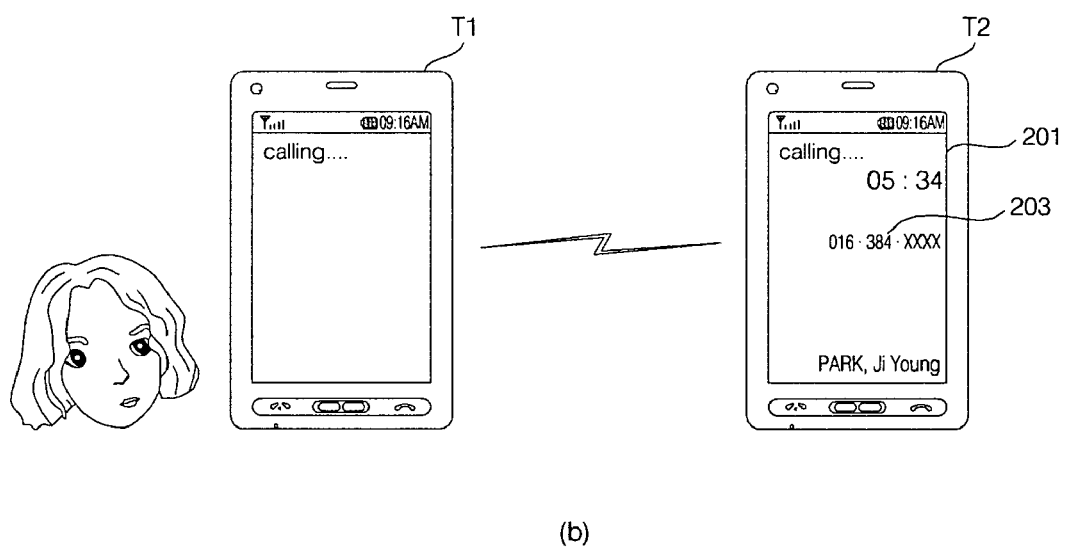
(b)

FIG. 11
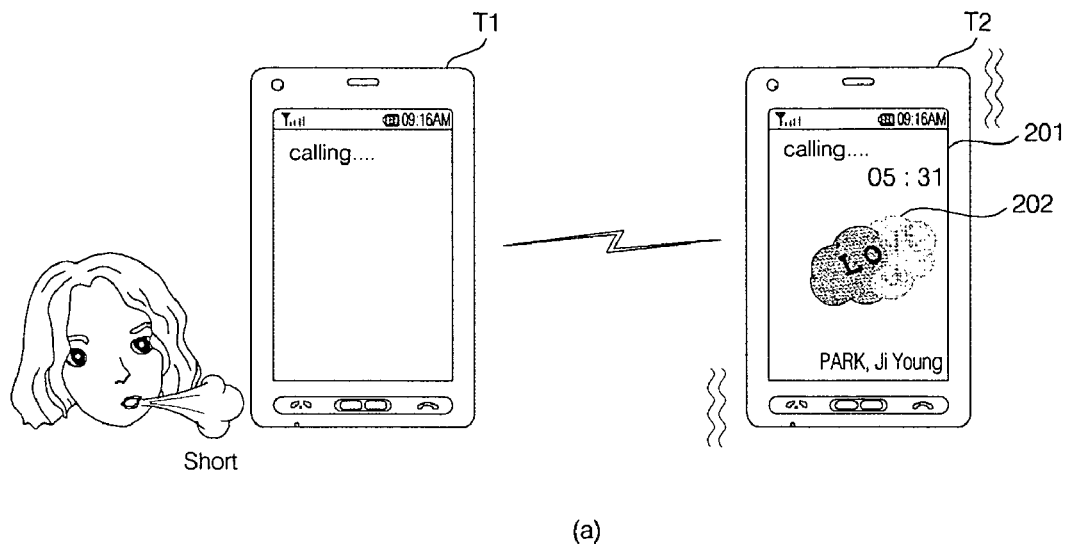
(a)
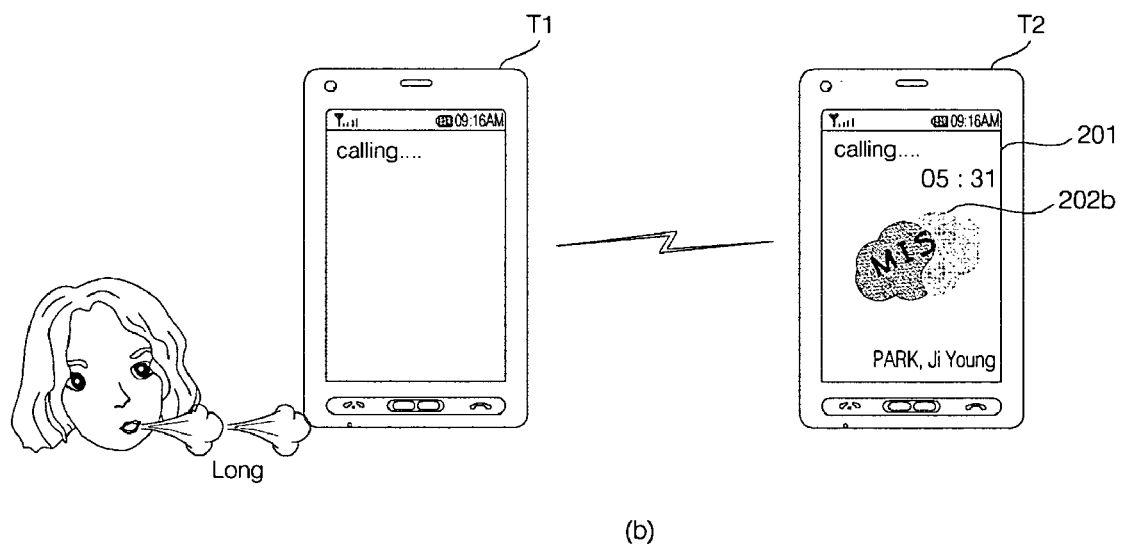
(b)

FIG. 12
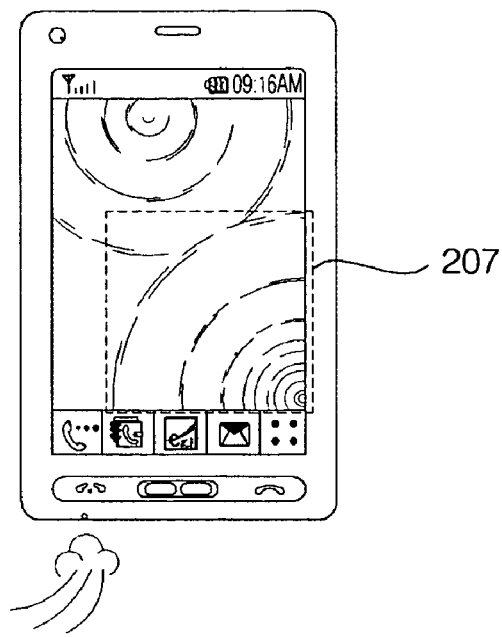
(a)
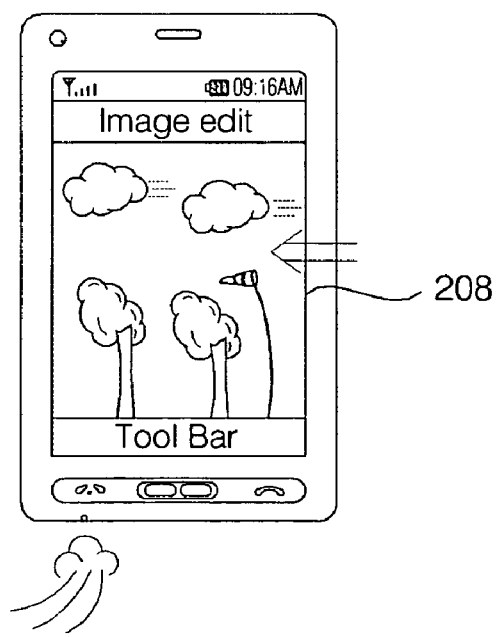
(b)

FIG. 18
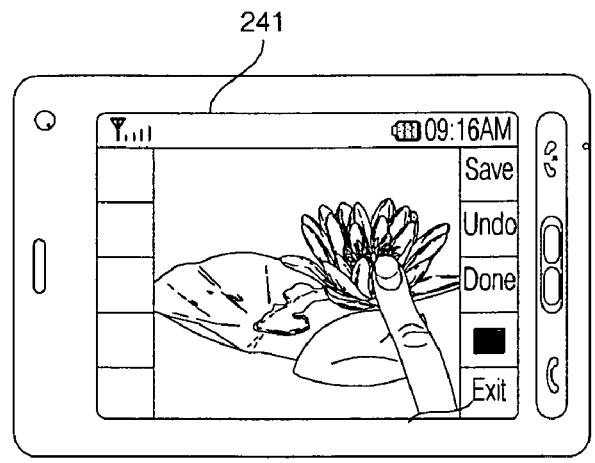
(a)
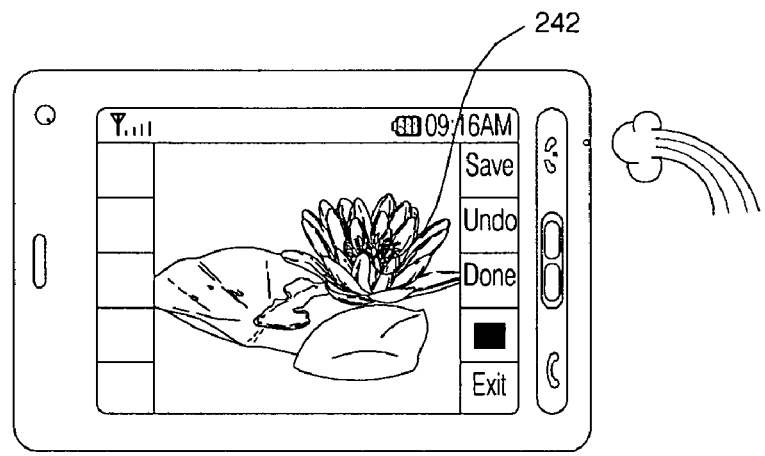
(b)
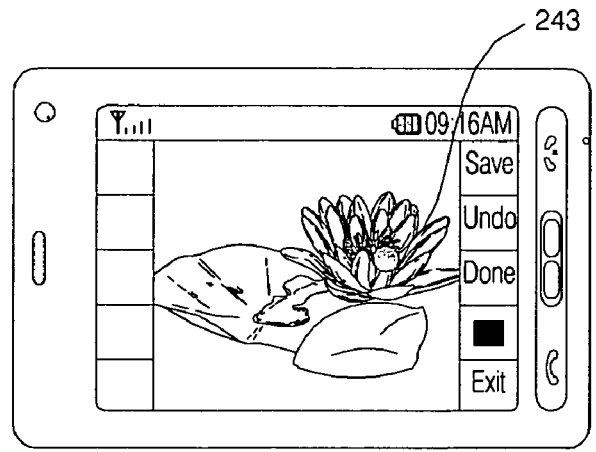
(c)

(a)           (b)           (c)

MOBILE TERMINAL AND OPERATION CONTROL METHOD THEREOF

CROSS-REFERENCE TO RELATED APPLICATION

This application claims the benefit of Korean Application No. 10-2009-0018107, filed Mar. 3, 2009 in the Korean Intellectual Property Office, the disclosure of which is incorporated herein by reference.

BACKGROUND OF THE INVENTION

1. Field of the Invention

The present invention relates to a mobile terminal and corresponding method for controlling an operation of the mobile terminal based on a based on a user blowing into the mobile terminal.

2. Description of Related Art

Mobile terminals are portable devices, which can provide users with various services such as a voice calling service, a video calling service, an information input/output service, and a data storage service. Many terminals also allow users to capture photos or moving pictures, play music files or moving image files, play game programs, and receive broadcast programs. Thus, mobile terminals now function as multimedia players. However, the input selection methods provided with the mobile terminals are restricted and limited in nature, which inconveniences the user.

SUMMARY OF THE INVENTION

Accordingly, one object of the present invention is to provide a mobile terminal and corresponding method for providing different visual and haptic effects based on a user blowing into the terminal.

Another object of the present invention is to provide a mobile terminal and corresponding method for providing different visual and haptic effects between users conducting a phone call when any one of the users blows into the mobile terminal.

Another object of the present invention is to provide a mobile terminal and corresponding method for providing feedback based on how accurate a proximity or pressure touch is input on the mobile terminal.

Still another object of the present invention is to provide a mobile terminal and corresponding method for providing feedback based on how accurate a blow signal is input to the mobile terminal.

To achieve these and other advantages and in accordance with the purpose of the present invention, as embodied and broadly described herein, the present invention provides in one aspect a method of controlling a mobile terminal, and which includes receiving an blow signal corresponding to a blowing action into a microphone of the mobile terminal, and generating at least one of a visual effect and a vibration effect based on characteristics of the blow signal.

In another aspect, the present invention provides a mobile terminal including a microphone configured to receive an blow signal corresponding to a blowing action into the microphone of the mobile terminal, and a controller configure to control at least one of a visual effect and a vibration effect based on characteristics of the blow signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawing in which:

FIG. 8 includes graphs showing a relationship between a blowing strength and a vibration strength according to an embodiment of the present invention;

FIG. 9 includes overviews of display screens illustrating different actions being performed on a second terminal based on a blowing action into a first terminal according to an embodiment of the present invention;

FIGS. 11-19 includes overviews of display screens illustrating different actions being performed on a mobile terminal based on a blowing action into the mobile terminal according to an embodiment of the present invention.

DETAILED DESCRIPTION OF THE INVENTION

The present invention will hereinafter be described in detail with reference to the accompanying drawings in which exemplary embodiments of the invention are shown. In addition, the term 'mobile terminal' in the following description refers to a mobile phone, a smart phone, a laptop book computer, a digital broadcast receiver, a personal digital assistant (PDA), a portable multimedia player (PMP), a navigation device, etc.

Figure 1:
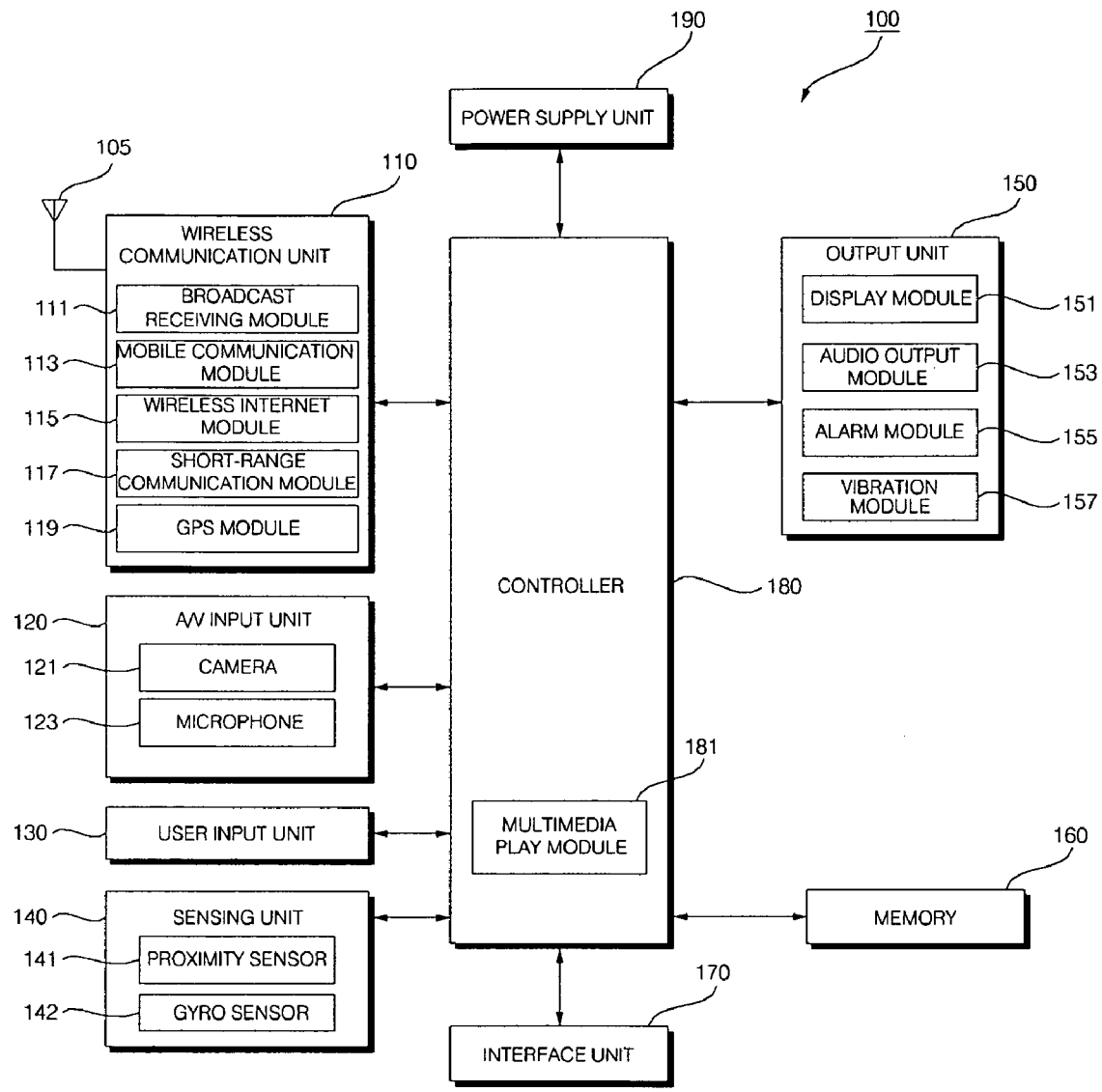
FIG. 1 is a block diagram illustrating a mobile terminal according to an exemplary embodiment of the present invention.

FIG. 1 is a block diagram illustrating a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a control unit 180, and a power supply unit 190. Two or more of the wireless communication unit 110, the A/V input unit 120, the user input unit 130, the sensing unit 140, the output unit 150, the memory 160, the interface unit 170, the control unit 180, and the power supply unit 190 may be incorporated into a single unit, or some of the units may be divided into two or more smaller units.

In addition, in FIG. 1, the wireless communication unit 110 includes a broadcast reception module 111, a mobile communication module 113, a wireless Internet module 115, a short-range communication module 117, and a global positioning system (GPS) module 119. The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this instance, the broadcast-related information may be received by the mobile communication module 113, rather than by the broadcast reception module 111. The broadcast-related information may come in various forms, for example, an electronic program guide (EPG) of the digital multimedia broadcasting (DMB) system or an electronic service guide (ESG) of the digital video broadcast-handheld (DVB-H) system.

Further, the broadcast reception module 111 may receive the broadcast signal using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be configured to be suitable for nearly all types of broadcasting systems other than those set forth herein. The broadcast signal and/or the broadcast-related information received by the broadcast reception module 111 may also be stored in the memory 160. In addition, the mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

Further, the wireless Internet module 115 is a module for wirelessly accessing the Internet, and may be embedded in the mobile terminal 100 or be installed in an external device. Also, the short-range communication module 117 is a module for short-range communication, and may use various short-range communication techniques such as Bluetooth, radio frequency identification (RFID), infrared data association (IrDA), ultra wideband (UWB), and ZigBee.

In addition, the GPS module 119 receives position information from a plurality of GPS satellites, and the A/V input unit 120 is used to receive audio signals or video signals. In FIG. 1, the A/V input unit 120 includes a camera module 121 and a microphone module 123. The camera module 121 processes various image frames such as still images or moving images captured by an image sensor during a video call mode or an image capturing mode. The image frames processed by the camera module 121 may be displayed by a display module 151 included in the output unit 150. Further, the image frames processed by the camera module 121 may be stored in the memory 160 or may be transmitted outside the mobile terminal 100 through the wireless communication unit 110. The mobile terminal 100 may also include two or more camera modules 121.

In addition, the microphone module 123 receives external sound signals during a call mode, a recording mode, or a voice recognition mode with the use of a microphone and converts the sound signals into electrical sound data. In the call mode, the mobile communication module 113 converts the electrical sound data into data that can be readily transmitted to a mobile communication base station and then outputs the data obtained by the conversion. The microphone module 123 may also use various noise removal algorithms to remove noise that may be generated during the reception of external sound signals. Further, the user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

In addition, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slide-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device. In FIG. 1, the sensing unit 140 also includes a proximity sensor 141 that determines whether there is an entity nearby and approaching the mobile terminal 100 without any mechanical contact with the entity. More specifically, the proximity sensor 141 can detect an entity that is nearby and approaching by detecting a change in an alternating magnetic field or the rate of change of static capacitance. The sensing unit 140 may also include two or more proximity sensors 141.

Also, the output unit 150 may output audio signals, video signals and alarm signals. The output unit 150 in FIG. 1 includes the display module 151, a sound output module 153, an alarm module 155, and a vibration module 157. The display module 151 displays various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the sound output module 153 may output audio data received by the wireless communication unit 110 during a call reception mode, a call mode, a recording mode, a voice recognition mode, or a broadcast reception mode or may output audio data present in the memory 160. In addition, the sound output module 153 may output various sound signals associated with the functions of the mobile terminal 100 such as receiving a call or a message. The sound output module 153 may also include a speaker and a buzzer. In addition, the alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may also output a signal upon receiving a call signal or a message. In addition, the alarm module 155 may receive a key signal and may output a signal as feedback to the key signal. Thus, once a signal is output by the alarm module 155, the user can recognize that an event has occurred. A signal for notifying the user of the occurrence of an event may also be output by the display module 151 or the sound output module 153.

The vibration module 157 may generate various types of vibrations having various intensities. The intensity, pattern, frequency, moving direction and moving speed of vibrations generated by the vibration module 157 may be determined by a vibration signal. The mobile terminal 100 may also include two or more vibration modules 157.

Further, the memory 160 stores various programs for the operation of the control unit 180. In addition, the memory 160 temporarily stores various data such as a phonebook, messages, still images, or moving images. The memory 160 may also include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may also operate a web storage, which performs the functions of the memory 160 on the Internet.

In addition, the interface unit 170 can interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 can also receive data from an external device or be powered by an external device. The interface unit 170 can transmit data provided by an external device to other components in the mobile terminal 100 or transmit data provided by other components in the mobile terminal 100 to an external device.

In addition, the control unit 180 controls the overall operations of the mobile terminal 100. For example, the control unit 180 performs various control operations regarding making/receiving a voice call, transmitting/receiving data, or making/receiving a video call. In FIG. 1, the control unit 180 includes a multimedia play module 181, which plays multimedia data. The multimedia play module 181 may be implemented as a hardware device and may be installed in the control unit 180. Alternatively, the multimedia play module 181 may be implemented as a software program. Further, the power supply unit 190 is supplied with power by an external power source or an internal power source and supplies power to other components in the mobile terminal 100. The mobile terminal 100 may include a wired/wireless communication system and a satellite-based communication system, and may be configured to be able to operate in a communication system transmitting data as frames or packets.

Next, the exterior of the mobile terminal 100 will be described with reference to FIGS. 2 and 3. In the following description, the mobile terminal 100 is a bar-type mobile phone with a touch screen on its front surface. However, the embodiments of the present invention can be applied to any type of phone with a touch screen.

Figure 2:
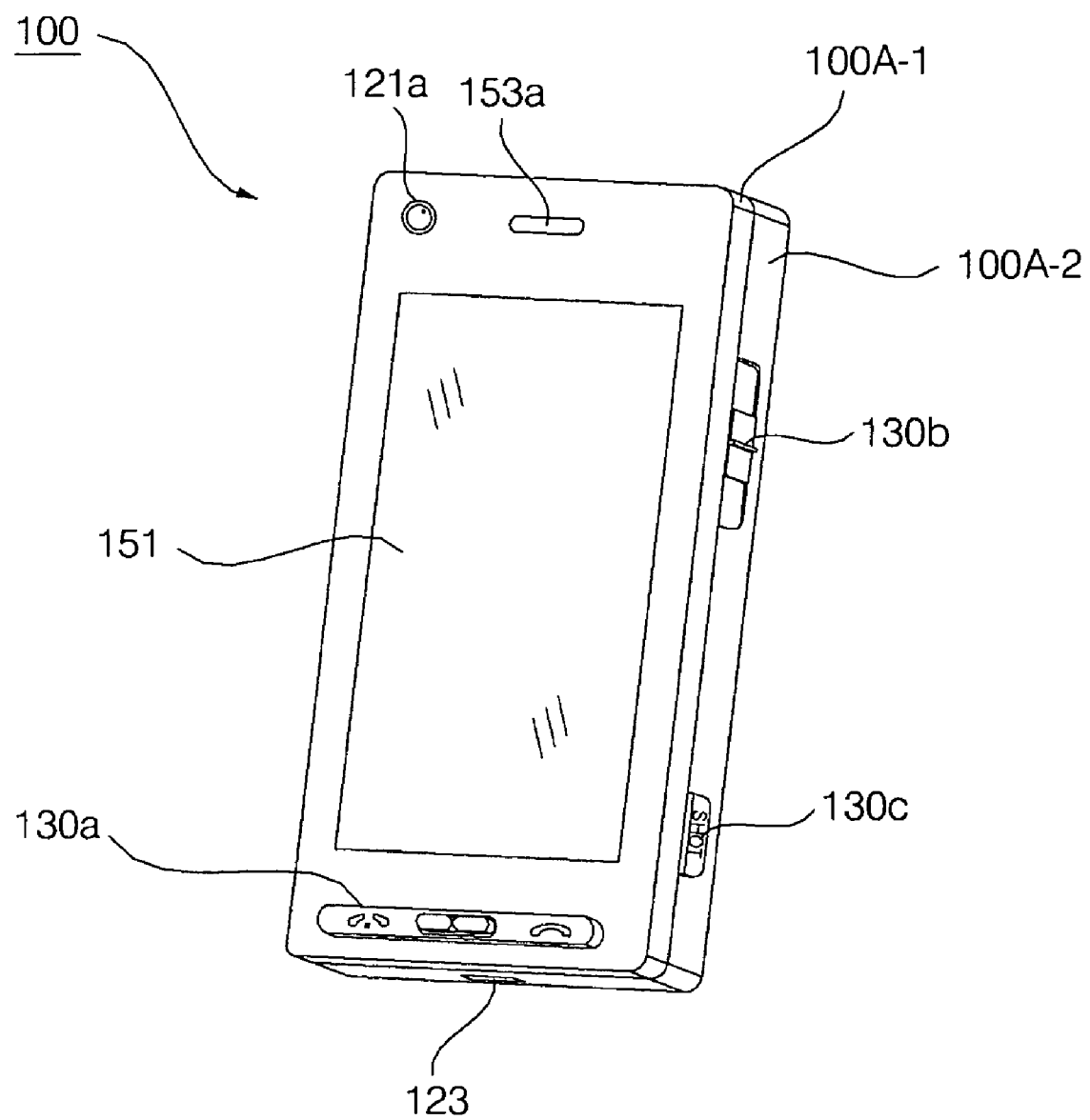
FIG. 2 is a front perspective view of the mobile terminal shown in FIG. 1.

FIG. 2 is a front perspective view of the mobile terminal 100 shown in FIG. 1. Referring to FIG. 2, the mobile terminal 100 includes a front case 100A-1 and a rear case 100A-2, which form the exterior of the first body 100A. Various electronic products are also installed in the space between the front case 100A-1 and the rear case 100A-2. At least one intermediate case may also be disposed between the front case 100A-1 and the rear case 100A-2. Further, the front case 100A-1 and the rear case 100A-2 may be formed of a synthetic resin through injection molding, or be formed of a metal such as stainless steel (STS) or titanium (Ti).

The display unit 151 (hereinafter referred to as display 151), a first sound output module 153a, a first camera 121a, and a first user input unit 130a are disposed in the first body, and particularly, in the front case 100A-1. A second user input unit 130b, a third user input unit 130c, and the microphone 123 are disposed on a lateral side of the rear case 100A-2.

Also, as discussed above, the display 151 may include an LCD or an OLED, which visually represents information. Since a touch pad is configured to overlap the display 151 and thus to realize a layered structure, the display 151 can function as a touch screen. Thus, it is possible for a user to input information to the display 151 simply by touching the display 151. Further, the first sound output module 153a may be implemented as a receiver or a speaker and the first camera 121a is configured to capture a still image or a moving image of a user. The microphone 123 also receives the voice of a user and other sounds.

Also, the first through third user input unit 130a-130c may be collectively referred to as the user input unit 130. The user input unit 130 may also adopt various manipulation methods and offer tactile feedback to a user. For example, the user input unit 130 may be implemented as a dome switch or a touch pad which receives a command or information upon being pushed or touched by a user. Alternatively, the user input unit 130 may be implemented as a wheel, a jog dial, or a joystick. The first user input unit 130a can allow a user to input such commands as 'start', 'end', and 'scroll', the second input unit 130-b can allow a user to input numbers, characters or symbols, and the third input unit 130-c can serve as a hot key for activating certain functions of the mobile terminal 100.

Figure 3:
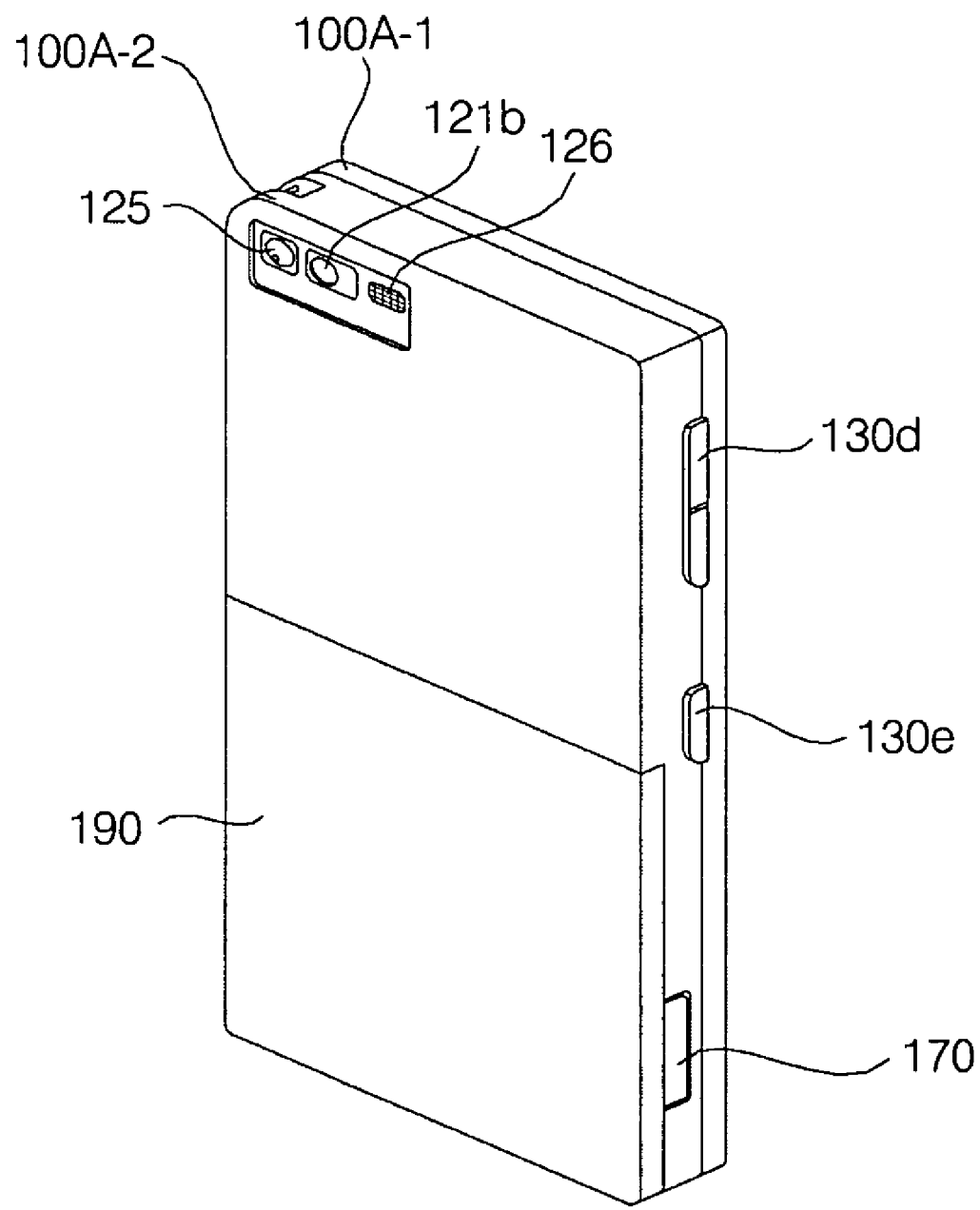
FIG. 3 is a rear perspective view of the mobile terminal shown in FIG. 1.

Next, FIG. 3 is a rear perspective view of the mobile terminal 100 shown in FIG. 2. Referring to FIG. 3, a fourth user input unit 130d, a fifth user input unit 130e, and the interface unit 170 are disposed on a lateral side of the rear case 100A-2. A second camera 121b is also disposed at the rear of the rear case 100A-2. Further, the second camera 121b may have a different photographing direction from that of the first camera 121a shown in FIG. 2. In addition, the number of pixels of the second camera 121b may be different from the number of pixels of the first camera 121a. For example, the first camera 121a may be used to capture an image of the face of a user and then transmit the captured image during a video call. Thus, a low-pixel camera may be used as the first camera module 121a. The second camera 121b may be used to capture an image of an ordinary subject. Given that images captured by the second camera 121b generally do not need to be transmitted, a high-pixel camera module may be used as the second camera 121b.

Also, a mirror 125 and a camera flash 126 are disposed near the second camera 121b. A user can then look in the mirror 125 when capturing an image of himself/herself with the second camera 121b. Further, the camera flash 126 illuminates a subject when the second camera 121b captures an image of the subject. A second sound output module may be also be provided in the rear case 100A-2, and thus realize a stereo function together with the first sound output module 153a shown in FIG. 2. The second sound output module may also be used in a speaker phone mode.

In addition, an antenna for receiving a broadcast signal may be provided on one side of the rear case 100A-2, and be retracted from the rear case 100A-2. The interface unit 170 also serves as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may also be a user authentication module such as a SIM or a UIM or may be a card socket for an exterior-type card such as a memory card for storing data.

Further, the power supply unit 190 may be inserted in the rear case 100A-2. The power supply unit 190 may be a rechargeable battery and be coupled to the rear case 100A-2 so as to be able to be attached to or detached from the rear case 100A-2. The second camera 121b is also illustrated in FIG. 3 as being disposed on the second body 100B, but the present invention is not restricted to this. In addition, the first camera 121a may be able to rotate and thus to cover the photographing direction of the second camera 121a. In this instance, the second camera module 121b may be optional.

Figure 4:
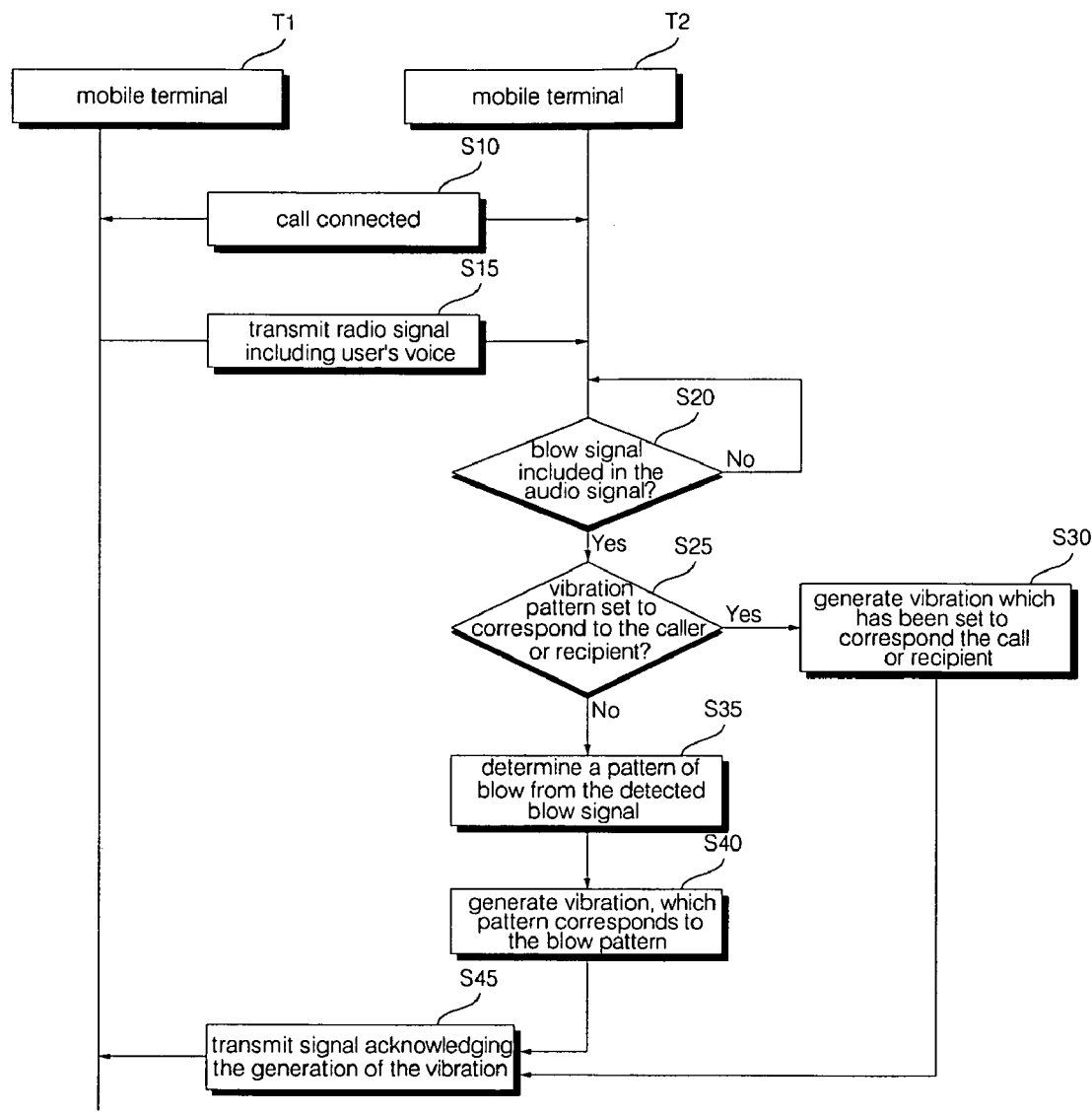
FIGS. 4-6 are flowcharts illustrating a method of operating a mobile terminal according to one embodiment of the present invention.
Figure 5:
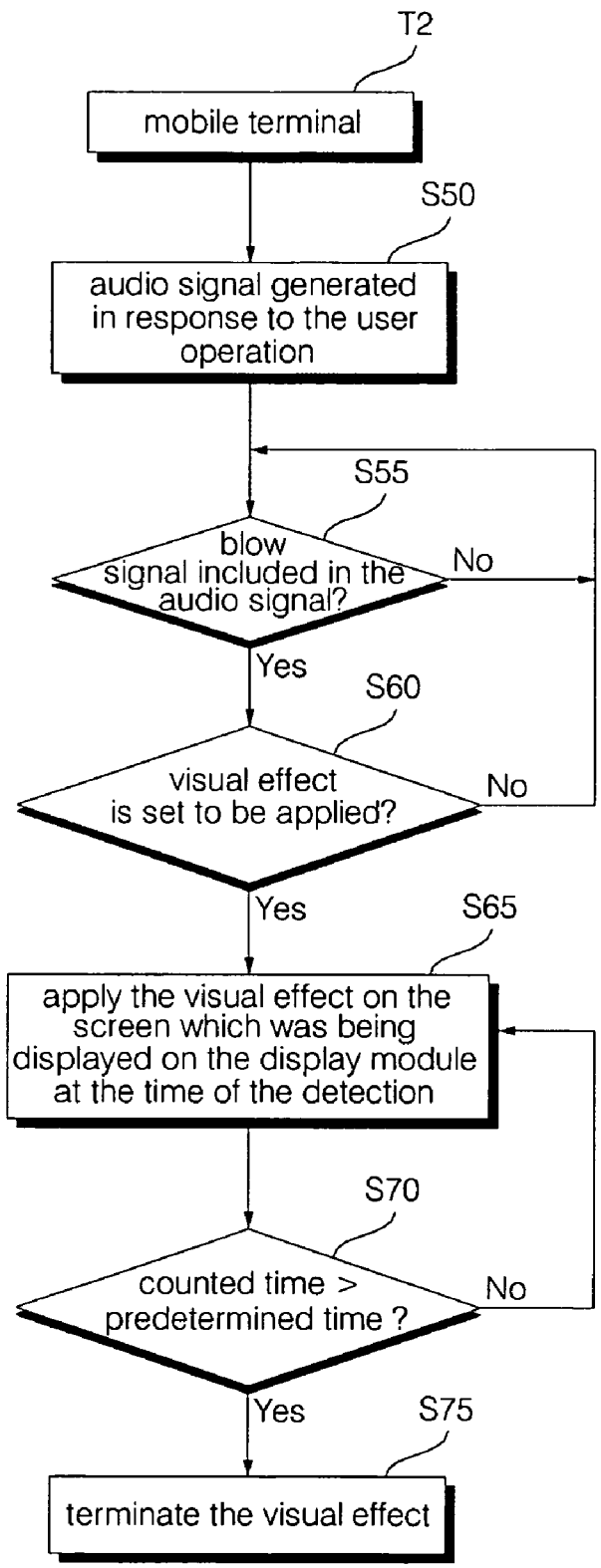
Figure 6:
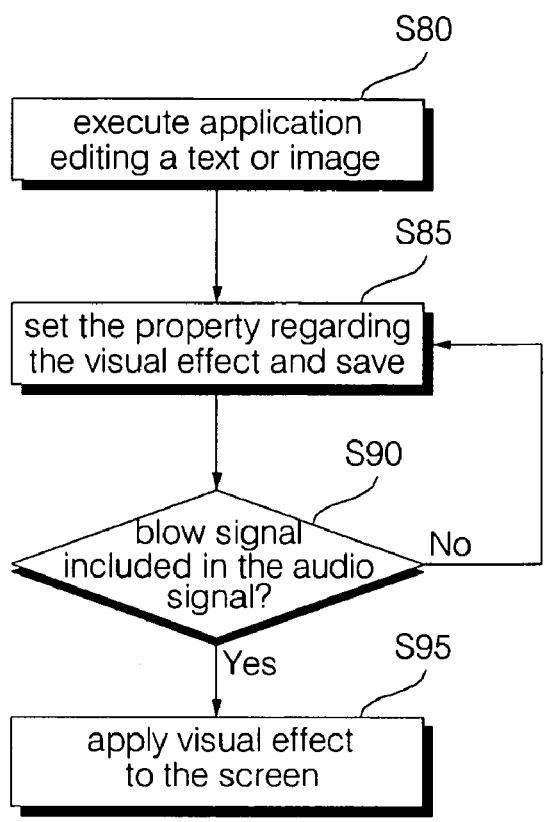

Next, FIGS. 4-6 are flowcharts illustrating a method of operating a mobile terminal according to one embodiment of the present invention. In particular, FIG. 4 illustrates operations performed between mobile terminals T1 and T2. In addition, in this example, the mobile terminal T2 is equipped with a vibration module 157 (the mobile terminal T1 can also be equipped with a vibration module). Further, the controller 180 controls the vibration module 157 to generate a vibration upon detection of a user blowing into the mobile terminal T1 (hereinafter referred to as blowing action). The blowing action can be input by the user of the mobile terminal or the caller or recipient of a call. Thus, in the example shown in FIG. 4, the user of the mobile terminal T1 blows into their terminal, and the mobile terminal T2 vibrates based on the blowing action performed on the mobile terminal T1.

In more detail, and as shown in FIG. 4, the mobile terminal T2 is connected to mobile terminal T1 during a calling operation (S10). When the mobile terminal T2 is connected to the mobile terminal T1 during the calling operation, the mobile terminal T2 receives or transmits a radio signal via the wireless communication unit 110. The radio signals may be audio signals enabling the call between the two users. Further, as shown in FIG. 4, during the calling operation, the controller 180 of the mobile terminal T2 receives the radio signal transmitted from the mobile terminal T1 (S15). In addition, the radio signal sent by the mobile terminal T1 may include the voice of the user of mobile terminal T1 and a sound (a blow signal) corresponding to the user blowing into the mobile terminal T1.

Thus, the controller 180 of the mobile terminal T2 receives the radio signal from the mobile terminal T1 and detects whether there is a blow signal included in the audio signal (S20). The blow signal may be an audio signal of a certain range of frequency, loudness or pattern. Therefore, the mobile terminal T2 can distinguish the blowing action of the user of the mobile terminal T1 among the audio signals and respond in accordance with the blow signal. When the blow signal is detected among the received audio signal (Yes in S20), the controller 180 of the mobile terminal T2 determines whether the mobile terminal T2 is set to generate a vibration corresponding to the blowing action performed on the mobile terminal T1 (S25).

In more detail, the user of the mobile terminal T2 can set the pattern of the vibration to be generated upon the detection of the blow signal during the calling operation with the mobile terminal T1. For instance, the user of the mobile terminal T2 can set the mobile terminal T2 to generate a vibration according to pattern P1 when the blow signal is detected during the calling operation with the mobile terminal T1. The user of the mobile terminal T2 can also set the mobile terminal T2 to generate a different vibration pattern when a blow signal is detected during a call with a different mobile terminal. In addition, the vibration pattern may be the change of strength of vibration over time.

When the controller 180 determines there is a vibration pattern set for the mobile terminal T1 (Yes in S25), the controller 180 controls the vibration module 157 to generate a vibration according to the set pattern (S30). However, it there is no vibration pattern set to correspond to the caller or recipient of the current calling operation (No in S25), the controller 180 determines a blowing pattern from the detected blow signal (S35). The blowing pattern may be determined by a strength or how hard the user blows into the mobile terminal, a number of times the user blows into the mobile terminal, an interval time between blowing actions, etc. The controller 180 then controls the vibration module 157 to generate a vibration pattern corresponding to the determined blowing pattern (S40). The controller 180 also transmits signals to the mobile terminal T1 to inform the user of the mobile terminal T1 that the vibration effect has been generated on the mobile terminal T2 (S45).

One method for detecting a blow signal among the audio signal will now be explained in more detail. For instance, the controller 180 can determine the sound pressure of the audio signal, and which may range from 1 to 32767 in reference to voice energy. The controller 180 can also detect the range of sound pressure belonging to a blowing action range of sound pressure. Further, the range of sound pressure between the sound of voice and the sound of wind made by the blowing action is different. Thus, the data of each range may be stored in the mobile terminal T2, and the controller 180 can detect whether there is a range of sound pressure belonging to a blowing action range of sound pressure among the audio signal according to the stored data. When the controller 180 detects that there is a range of sound pressure belonging to a blowing action range of sound pressure among the audio signal, the controller 180 determines that there is a blow signal among the audio signal.

The controller 180 can also differentiate the blowing action sound pressure into eight steps from zero to seven in the one embodiment. The controller 180 can then generate a vibration effect to have a strength corresponding to the detected blow signal sound pressure. For instance, if the step of the sound pressure of the detected blow signal is step '0', the controller 180 controls the vibration module 157 to generate a weak vibration. However, if the step of the sound pressure of the detected blow signal is step '7', the controller 180 controls the vibration module 157 to generate a strong vibration.

The controller 180 can also generate a vibration to correspond to the detected blow signal sound pressure. For example, the controller 180 can compose a vibration pattern to be generated to correspond to the pattern of the blow signal sound pressure, and control the vibration module 157 to generate a vibration according to the composed pattern. The controller 180 can also select a proto-type pattern corresponding most closely to the detected blow signal sound pattern among stored proto-type patterns in the mobile terminal. The controller 180 then controls the vibration module 157 to generate a vibration according to the selected pattern. Other methods of detecting the detecting the blow signal and generating the vibration can also be used.

Thus, according to an embodiment of the present invention, the mobile terminal T2 can detect the blowing action input by the user of the mobile terminal T1. A similar concept applies to the user of the mobile terminal T2 blowing into their terminal and the mobile terminal T1 generating a particular vibration effect. Further, the blow signal can be included in the audio signal transmitted between terminals. The audio signal may be an audio signal received through the wireless communication unit 110 or an audio signal generated from A/V input unit 120 in response to signals generated from the microphone 122 (i.e., the user blowing and/or speaking into the microphone 122).

Next, FIG. 5 is a flowchart illustrating a mobile terminal applying a visual effect to information displayed on the mobile terminal based on a user blowing into the mobile terminal. In this example, an audio signal is generated in the mobile terminal T2 (S50). For example, the audio signal can be generated when the user of the mobile terminal T2 blows into the microphone 122 (or speaks into the microphone 122). Thus, the controller 180 detects whether a blow signal is included in the audio signal (S55). When the controller 180 determines that the blow signal is included in the audio signal (Yes in S55), the controller 180 determines whether the mobile terminal T2 is set to apply a visual effect (e.g. a wind effect) on the screen displayed on the display module 151 upon the detection of the blow signal (S60).

Further, the user of the mobile terminal T2 can set the mobile terminal to execute particular operations corresponding to the blowing action performed on the terminal T2. In particular, the operations corresponding to the blowing action can be an application executed upon the detection of the blow signal, an operation that changes the screen which is displayed on the display module, etc. In FIG. 5, the mobile terminal T2 is set to change a screen being displayed on the mobile terminal such that the screen corresponds to the blowing action.

When the controller 180 determines the visual effect is set to be applied to terminal (Yes in S60), the controller 180 applies the visual effect on the screen displayed on the mobile terminal T2 when the blow signal is detected (S65). For instance, the controller 180 can display a new text or image that was not previously displayed on the mobile terminal T2, can delete a text or image currently being displayed on the display module 151 at the time of the detection, etc. when the blow signal is detected. In another example, the controller 180 can change the color or shape of text or image currently being displayed on the mobile terminal, can shake, move, dim or sharpen a text or image currently being displayed on the mobile terminal, can magnify or reduce the size of text or image currently being displayed on the mobile terminal, etc. at the time of the detection.

As shown in FIG. 5, the controller 180 then counts the amount of time after applying the visual effect is applied (S70). That is, in one embodiment, the controller 180 only applies the visual effect for a predetermined amount of time. Thus, when the time counted passes a predetermined time, the controller 180 stops applying the visual effect on the screen (S75). Further, the display screen after applying the visual effect may be the display screen being displayed prior to applying the visual effect, may be a default display screen after the visual effect is applied for a certain period of time, etc. The predetermined amount of time the visual effect is to be applied can also be set and changed by the user of the mobile terminal. Also, the user can set the mobile terminal such that the visual effect remains until there is an input indicating the visual effect is to be terminated.

Thus, in this embodiment, the controller 180 applies a visual effect (e.g., wind effect) on a screen displayed on the terminal upon the detection of the blowing action. The visual effect can be a wind effect, which changes the screen currently being displayed to correspond to the blowing action. Also, when the visual effect is applied, the controller 180 can display text or an image not previously displayed, delete text or an image currently displayed, change at least one of a color, shape and size of text or image currently displayed on the screen, move text or an image currently displayed, etc. to correspond to the action. That is, the visual effects include various types of screen changing effect that change the screen being displayed when the blow signal is detected.

Next, FIG. 6 is a flowchart illustrating applying a visual effect to text or image displayed on the terminal based on a received blow signal according to an embodiment of the present invention. The user can also set the wind effect ON in the mobile terminal according to this embodiment of the present invention. As shown in FIG. 6, the controller 180 execute applications for editing a text or image in response to a user command (S80). The applications for editing a text or image may be an application enabling the user to send and receive text or multimedia messages, create a memo in the mobile terminal, capture or edit a picture or motion picture, or edit the text or image displayed as a background screen on the terminal. Also, the application may be an application enabling the user to edit the text or image, which is to be displayed on the screen, while the visual effect is applied.

Further, in FIG. 6, the user can set a property of a play object, such as text or image, to be applied the visual effect upon the detection of the blowing action before or after editing the text or image (S85). The user can also save the set properties. For instance, the user can set the visual effect (e.g., a wind effect) to be applied on the screen after editing the memo (or other text or image). Therefore, the property of the object (e.g., an edited memo) can be set to be applied the visual effect when the blow action is detected. The user can also set an area for the visual effect to be applied. For instance, when the controller 180 detects the blowing action, the user can set a certain area on the display module 157 to display a text or image which was not being displayed on the display module 157 at the time of the detection.

In another embodiment, when the controller 180 detects the blowing action, the user can set a screen of a certain area to be changed to correspond to the detected blowing action. In another embodiment, if a screen is displayed on a touch screen, the user can set the properties of the screen such that only the touched area is applied the visual effect when the blowing action is detected. Also, user may set a text or image to be displayed on the screen when the visual effect is applied. For instance, if a blowing action is detected when a memo is being displayed on the screen, the user can set a text message to appear on the screen as a pop-up window. The user can also set the property of the object, which is to be applied visual effect when the blowing action is detected, after editing the object. The user can also set the property of the object before editing the object. Thus, the user can set the property of the memo after or before editing the memo.

In another embodiment, the user can set that an idle screen, which is displayed on the display module 151 when the mobile terminal is in an idle mode, is applied the visual effect when the blowing action is detected. Text or image being displayed on the idle screen can then change to correspond to the blowing action. Also, a text message can be displayed on the idle screen when the blowing action is detected. The user can also set an area on which the visual effect is applied, set the text message or image to appear on the screen when the visual effect is applied, and set the amount of time the visual effect would last on the screen.

Thus, with reference to FIG. 6, after saving the property setting of the mobile terminal, the controller 180 detects whether a blow signal is included in an audio signal generated when the microphone 122 is operated by the user (S90). When the controller 180 detects the blow signal (Yes in S90), the controller 180 applies the visual effect on the screen being displayed on the display module 151.

In still another embodiment of the present invention, the user can set different types of visual effects to be applied on play objects within an application. For instance, is there are two memos 'memo No. 1' and 'memo No. 2' that can be edited, stored or viewed through a memo related application, the user can set the property of the 'memo No. 1' to display a secret text message, if the blowing action is detected during the display of 'memo No. 1'. The user can also set the property of the 'memo No. 2' to delete certain text on the message, if the blowing action is detected during the display of 'memo No. 2'. Also, the user can set the property of a third memo 'memo No. 3' to have text included in the memo No. 3 be enlarged, if the blowing action is detected during the display of 'memo No. 3'. Likewise, the user can set different types of visual effects to be applied to different play objects.

In addition, the above-described embodiments with respect to FIGS. 4-6 can be applied to one mobile terminal on request. Also, when the mobile terminal T2 in the first embodiment of FIG. 4 detects the blow signal from the received audio signal, the controller 180 can change the screen being displayed as in the second and third embodiment besides or in addition to generating the vibration. Further, the above-described embodiments can be implemented in the mobile terminal T2, when T2 is the only mobile terminal equipped with applications to detect the blowing action, generate vibration or apply the visual effect on screen being displayed.

In yet another embodiment, the controller 180 can determine that there is a certain order input upon detecting the blowing action. For instance, the controller 180 can release the mobile terminal from the idle mode upon the detection of the blowing action. Thus, the controller 180 can determine that there is an order input, which orders the mobile terminal to be released from the idle mode upon the detection of the blowing action. Also, the controller 180 can operate the mobile terminal to display a received text message No. 2 if the blowing action is detected during the display of received text message No. 1. Likewise, the controller 180 can change the status of the application being executed when the blowing action is detected to correspond to the detected blow motion.

In the above-described embodiments, the controller 180 detects the blow signal from the audio signal received by the wireless communication unit 110 or generated from the microphone 122. In another embodiment, the controller 180 can detect the blow signal from other signals generated from various parts of the mobile terminal, such as user input unit 130 or sensing unit 140. In addition, the concept of detecting a blow signal from an audio signal can be determined from where the audio signal is received or generated. The application of the visual effect on the screen on the display module 151 can also last for a predetermined time.

Figure 7:
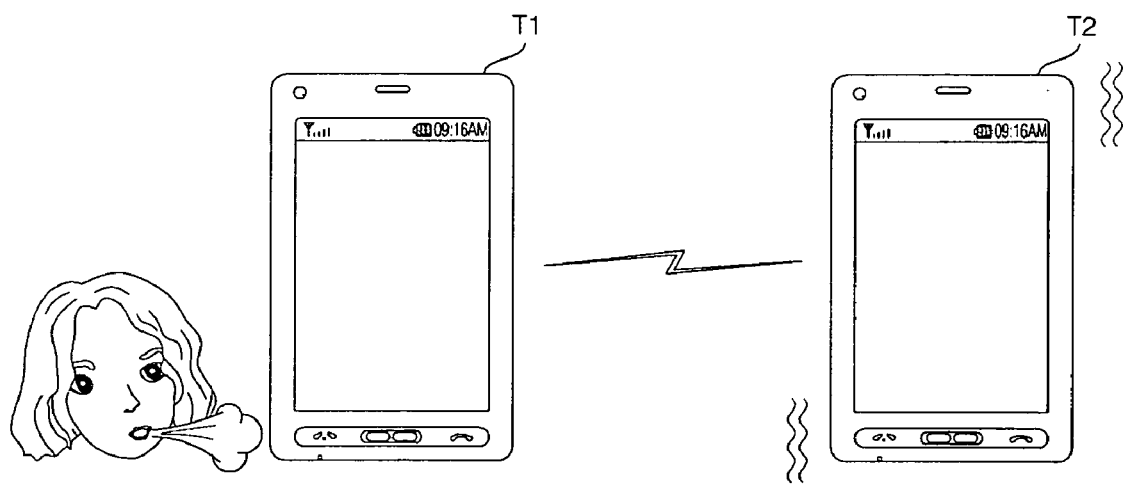
FIG. 7 is an overview of a display screen illustrating a second mobile terminal vibrating based on a blowing action into a first mobile terminal according to an embodiment of the present invention.

Next, FIG. 7 is an overview of a display screen illustrating a second mobile terminal vibrating based on a blowing action into a first mobile terminal according to an embodiment of the present invention, and FIG. 8 includes graphs showing a relationship between a blow strength and a vibration strength according to an embodiment of the present invention.

Referring to FIG. 7, when a user of mobile terminal T1 blows into the mobile terminal T1, the signal of the sound generated during the blowing action is transmitted to the mobile terminal T2. The user of the mobile terminal T1 may be a caller or a receiver of the call made between mobile terminals T1 and T2. In addition, the sound of the blowing action is included in a radio signal transmitted to the mobile terminal T2 by the mobile terminal T1, and is included with the sound of voice of the user of the mobile terminal T1. The mobile terminal T2 can then determine whether a blow signal is included in the received audio signal by detecting the sound pressure of the audio signal. The controller 180 can also control the vibration module 157 to generate a vibration when the blow signal is detected in the audio signal. These features were discussed in detail above.

In addition, the pattern of the vibration generated by the controller 180 may correspond to the pattern of the blow the controller 180 has detected. That is, when the user of the mobile terminal T1 blows into the mobile terminal, there is a pattern of the blowing action such as a change of strength of the blowing action according to the flow of time or intervals between the blowing action the user has made. Further, in FIG. 8, the controller 180 can detect the change of strength of the blowing action over time. The controller 180 can also detect the sound pattern of the audio signal to detect the pattern of the blowing action, and control the vibration module 157 to generate a vibration corresponding to the detected blow pattern.

Further, the controller 180 can also compose a pattern of the vibration itself or select a particular pattern among stored patterns to generate a vibration according to the blow pattern. The controller 180 then controls the vibration module 157 to generate a vibration according to the composed or selected pattern. In addition, FIG. 7 illustrates the mobile terminal T2 vibrating based on a blow signal being input to the mobile terminal T1, and FIG. 8 illustrates a relationship between the blowing strength and the vibrating strength. As shown, the vibrating strength follows the blowing strength in this embodiment.

Next, FIG. 9 includes overviews of display screens illustrating different actions being performed on a second terminal based on a blowing action into a first terminal according to an embodiment of the present invention. Referring to FIG. 9(a), when the user of mobile terminal T1 blows into the mobile terminal T1, the controller 180 of the mobile terminal T2 detects the blow signal included in the audio signal, and applies a visual effect on the screen 201 being displayed on the display module 151. In this example, the controller 180 displays an image 202 on the screen 201 when the blow signal is detected.

As shown in FIG. 9(a), the image 202 includes text previously set to be displayed on the screen upon the detection of the blow signal. As shown in FIG. 9 (a), the image 202 appears as a text written on a steamed window. Then, as shown in FIG. 9(b), after a predetermined amount of time passes after the user blows into the mobile terminal T1, the image 202 disappears from the screen 201. Thus, in this embodiment, the controller 180 of the mobile terminal T2 displays a screen notifying the user of the terminal T2 a call is incoming. In addition, as shown in FIG. 9(*b*), the controller 180 can display text 203 such as a phone number of the calling party when the image 202 disappears.

Further, a portion of the image 202 can be displayed dimly on the display module 157 to create a certain area on the screen of the mobile terminal T2 as if it is foggy or steamy. The specific features of the visual effect being implemented on the display module 157 can also vary upon the setting of the mobile terminal. For instance, an area on which the visual effect is to be applied, a time during which the visual effect would last or objects to be or not to be displayed when the visual effect is applied may vary upon the setting of the mobile terminal.

Figure 10:
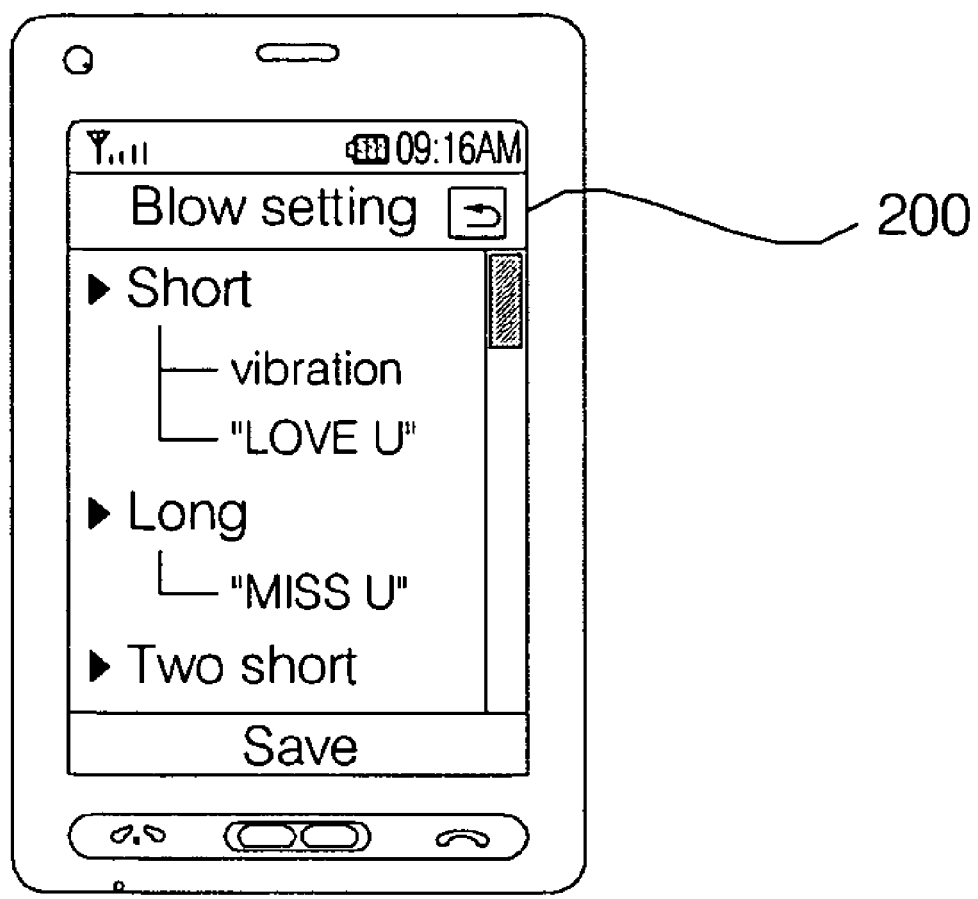
FIG. 10 is an overview of a display screen illustrating options for setting different actions to be performed based on a blowing action performed on the mobile terminal according to an embodiment of the present invention.

Next, FIG. 10 is an overview of a display screen illustrating options for setting different actions to be performed based on a blowing action performed on the mobile terminal according to an embodiment of the present invention. Referring to FIG. 10, the user can set the specific operation which is to be executed by the mobile terminal according to the pattern of the detected blow signal. In particular, the controller 180 displays a blow operation setting window 200 on the display module 151. The user can then set the specific operation the mobile terminal is to execute corresponding to the specific blow pattern.

For instance, when the user of the mobile terminal T1 blows once for a short amount of time into his or her mobile terminal during a phone call, the user of the mobile terminal T2 can set the mobile terminal to display the text such as 'LOVE U' in response to the detection of the blow signal. The user of the mobile terminal T2 can also set the mobile terminal T2 to vibrate upon the detection of the blow signal. Further, if the user of the mobile terminal T1 blows once for a long time during a phone call, the user of the mobile terminal T2 can set the mobile terminal T2 to display text such as 'MISS U' in response to the detection of the blow signal. The user of the mobile terminal T2 can also set the mobile terminal T2 not to vibrate upon the detection of the blow signal.

For example, FIG. 11(*a*) illustrates that when the user of the mobile terminal T1 blows once for a short amount of time during the call, the mobile terminal T2 vibrates and also displays the text 'LOVE U' via the image 202 on the screen 201. Further, as shown in FIG. 11(*b*), when the user of the mobile terminal T1 blows for a long time into their terminal during the call, the mobile terminal T2 does not vibrate, but rather only displays the text 'MISS U' via the image 202*b* on the screen 201. The misty or steaming effect is also displayed.

The user can also set the mobile terminal T2 to output the text using voice information through the audio output module 153. For instance, when the user of the mobile terminal T1 blows once shortly during a call, the mobile terminal T2 can output the voice information 'LOVE U' through the audio output module 153. The voice information can be the voice of the user of the mobile terminal T1 stored in mobile terminal T2 or a composed voice. Thus, as shown in the embodiments of FIGS. 10 and 11, the user can set the specific operations to be executed according to the blow signal included in the received audio signal.

Figure 13:
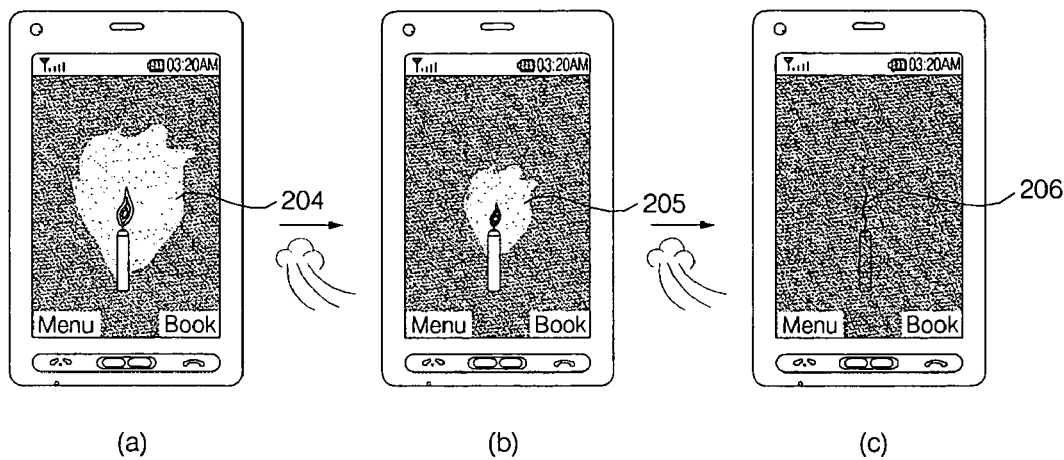

Next, FIGS. 12 and 13 are overviews of display screens illustrating different operations or visual effects being performed based on a received blow signal. That is, when the controller 180 of the mobile terminal T2 detects the user's blowing action, the controller 180 applies a visual effect on the screen being displayed on the display module 157. In this embodiment, the applied visual effect is an effect of changing a brightness of the screen being displayed. In particular, the brightness may adjusted by changing the color, contrast, or luminosity of the screen. The brightness may also be adjusted according to the shape of the object being displayed on the screen. For instance, the controller may diminish a particular area of an image displayed on the screen.

FIG. 12(*a*) is an overview of a display screen illustrating a ripple effect being applied to the screen based on the user blowing into the terminal. As shown, when the user blows into their mobile terminal when an idle screen is being displayed on the screen, the controller 180 creates a ripple effect on the screen. Further, the ripple effect may be a specific feature of the visual effect, which was set to be applied on the screen when the blow signal (or blowing action) is detected when the ideal screen is being displayed. In FIG. 12(*a*), the ripple effect is displayed as an image 207 on a particular area of the screen. As shown, the image 207 moves across the screen making a ripple effect. FIG. 12(*b*) illustrates an image edit window 208 having trees and clouds that appear to blow in the wind as the user is blowing into their terminal. That is, the controller 108 applies a wind effect on an image being edited.

FIG. 13 illustrates the controller 180 displaying an image 204 of a burning candle. As shown in FIG. 13(*a*), the candle is burning brightly. Then as shown in FIG. 13(*b*), the controller 180 displays an image 205 showing the burning candle being blown out as the user blows into their terminal. FIG. 13(*c*) illustrates the controller 180 displaying an image 26 showing the candle being completely blown out. Thus, in FIG. 13, the controller 180 provides a visual effect of blowing out a candle as the user blows into their terminal.

Thus, the embodiments of the present invention present various interactions between the user and the mobile terminal according to the user blowing into the terminal. Thus, the visual effect applied by the controller 180 includes an effect of changing the shape of the screen such that the shape may respond to the detected blowing motion. The change of the shape may be a change of a theme, etc. being displayed on the screen to correspond to the blowing action.

Figure 14:
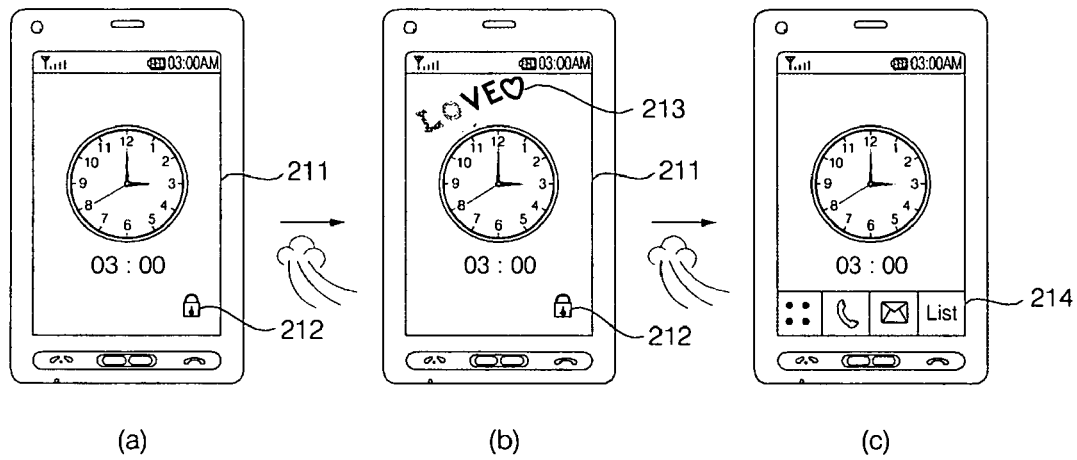

Next, FIG. 14 is an overview of display screens illustrating text or another type of image being displayed on the screen of the terminal as the user blows into the terminal. In particular, FIG. 14(*a*) illustrates the mobile terminal in a lock mode. The lock mode is a mode on a mobile terminal in which the touch screen is locked such that when the user touches the touch screen, nothing happens. In this embodiment, when the user of the mobile terminal blows into the mobile terminal during the lock mode, the controller 180 detects the blow signal included in the audio signal generated through the microphone 122. The controller 180 then applies a visual effect to the screen being displayed in the lock mode.

In this embodiment, and as shown in FIG. 14(*a*), the screen 211 being displayed in the lock mode is a clock. As shown, the controller 180 displays a lock-mode icon 212 to indicate to the user the screen is locked. Then, as shown in FIG. 14(*b*), when the controller 180 detects the user blowing into the terminal, the controller 180 display text 213 on the screen 211. Note that the mobile terminal 180 is still in the lock mode when the text 213 is displayed on the screen 211 as indicated by the displayed lock icon 212. Further, in this embodiment, when the user of the mobile terminal continues to blow into the mobile terminal for more than a predetermined amount of time, the controller 180 unlocks the mobile terminal. That is, as shown in FIG. 14(*c*), the controller 180 unlocks the mobile terminal, and displays icons 214 which may be used by the user to control the mobile terminal.

Figure 15:
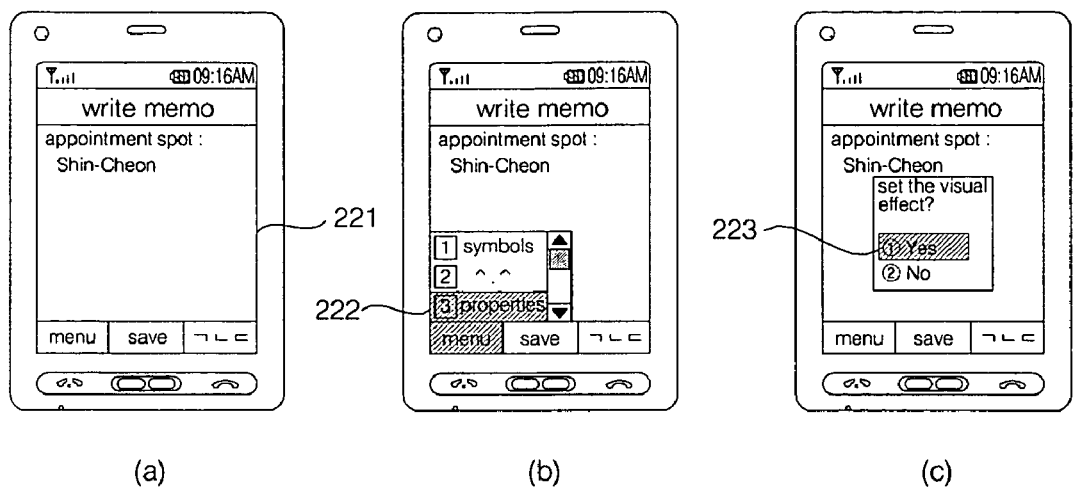
Figure 16:
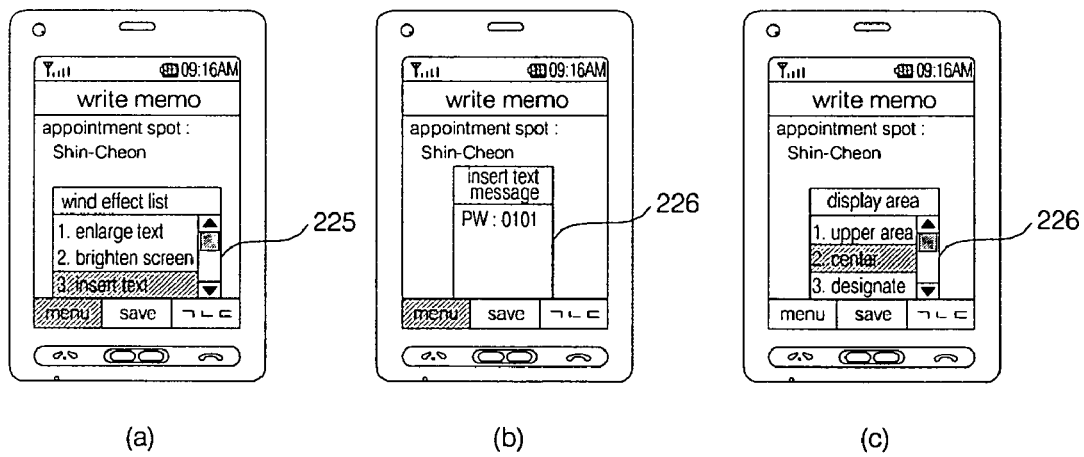

Next, FIGS. 15 and 16 include overviews of display screens the user can use to set different properties related to actions performed on the terminal when the user blows into the terminal. That is, the user can set the visual effect as a property of a play object. In this embodiment, the play object is a 'memo No. 1' corresponding to one of the memo play objects stored in the mobile terminal. As shown in FIG. 15(a), the controller 180 displays a memo editing screen 221 on the display module 151 when a memo related application is executed. The user can then edit or create a memo using the memo editing screen 221.

After the user inserts text of the memo onto the memo editing screen 221, as shown in FIG. 15(a), the user can select a 'menu' icon displayed on the lower left area of memo editing screen 221 as shown in FIG. 15(b). The controller 180 then displays a menu window 222 including different settings the user can select. The user can also scroll down the menu window 222 to search for a desired command to input into the mobile terminal. In FIG. 15(b), the user selects the '3. properties' option. Then, as shown in FIG. 15(c), the controller 180 displays a menu window 223 on the display area. As shown, the menu window 223 allows the user to set the visual effect as a property of the play object 'memo No. 1'. In particular, when the user select '1. Yes' on the menu window 223 in FIG. 15(c), the controller 180 sets the visual effect as the property of the 'memo No. 1', which is being edited in FIG. 15(a).

FIG. 16 illustrates the user setting the specific features of the visual effect. In particular, when the user selects to apply the visual effect to the play object 'memo No. 1' as in FIG. 15(c), the controller 180 displays features of the wind effect on a list window 225 as in FIG. 16(a). As discussed above, the visual effect corresponding to specific effect applied on the screen when the user blows into the mobile terminal while the play object 'memo No. 1' is displayed. In this embodiment, the features on the list window 225 are '1. enlarge the size of the text', '2. brighten the screen', and '3. insert text message'.

As shown in FIG. 16(a), the user selects the '3. insert text message' option among the features. Then, as shown in FIG. 16(b), the controller 180 detects the selection of the '3. insert text message' option and displays a text message editing window 226 on the screen. The user can then input a text message to appear on the screen when the user blows into the mobile terminal. In this example, the user inputs the text "PW:1010."

Figure 17:
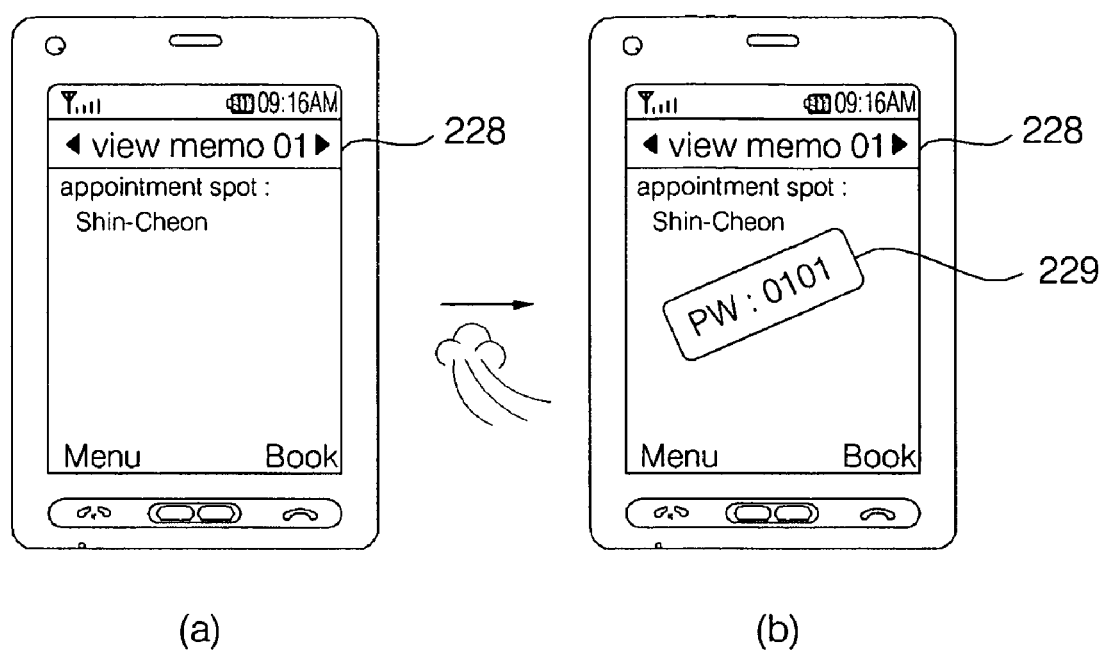

As shown in FIG. 16(c), the user can also select a particular area of the screen where the input text is to appear as the visual effect using a setting window 227. In this embodiment, the user sets the text message of the visual effect to appear at the center of the screen by selecting the '2. center' option among the visual effect apply area setting window 227. Thus, as shown in FIGS. 17(a) and (b), when the user blows into the terminal, the controller 180 displays the text 229 ('PW: 0101') on the center of the screen. Further, after the text 229 is displayed for a predetermined amount of time, the controller 180 stops applying the visual effect on the screen 228.

Next, FIG. 18 includes overviews of display screens illustrating the user touching a particular portion of the screen, and the controller 180 applying a visual effect to the touched portion of the screen. In particular, as shown in FIG. 18(a), the user touches a certain area on a touch screen 241. The touched area can also be identified by a marker such as a thin line 242 as shown in FIG. 18(b). Then, when the user blows into the mobile terminal through the microphone 122, the controller 180 detects the wind blowing action.

As shown in FIG. 18(c), the controller 180 dims the portion of the screen touched by the user as identified by the reference numeral 243. The visual effect applied the controller 180 can also to be show the flower image shown in FIG. 18 as blooming to a full flower image. The visual effect can also vary according to the setting of the mobile terminal or the blow pattern. Further, the visual effect may be an effect that allows the user to edit the touch portion (e.g., to change a color, size, etc. of the touched area). Also, the visual effect can be continuously applied even after a predetermined amount of time, and completed when the user selects a particular key such as a side key, for example.

Figure 19:
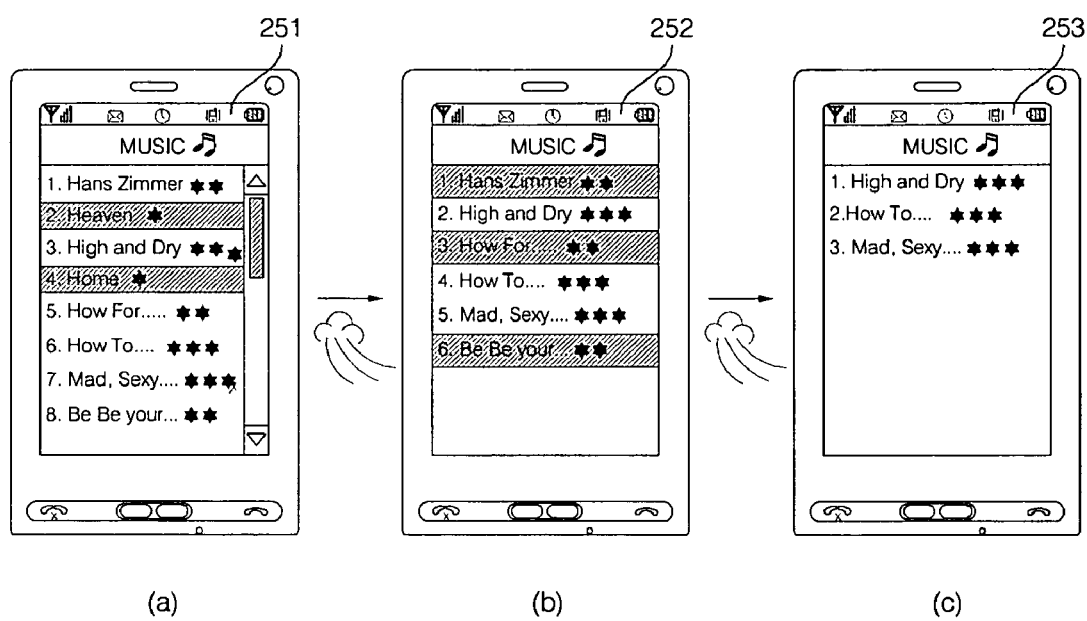

Next, FIG. 19 includes overviews of display screens in which the user can delete particular items in a list by blowing into the mobile terminal. In more detail, as shown in FIG. 19(a), the user can select item(s) he or she wants to delete among a music list screen 251. For example, the user can designate items to be deleted by touching each particular item. Then, when the user blows into the mobile terminal through the microphone 122, the controller 180 detects the blowing action and deletes the selected items as shown in FIG. 19(c).

A similar concept applies the user rearranging particular items in a list. In particular, the user can select particular items and then blow into the terminal. The controller 180 then rearranges the touched and untouched items such that the touched items are displayed first (or last) depending on the options set by the user on the terminal.

Thus, according to the above-described embodiments, the user can select an area on which the visual effect is to be applied upon the detection of the blow signal, as well as the features of the visual effect. For instance, when the user is editing a text message to be transmitted, the user can select certain text to be deleted by blowing into the mobile terminal. The object on which the visual effect is applied can be any type of text or image displayed on the mobile terminal. Also, the visual effect encompasses all types of effect related to the change of the screen. For instance, the visual effect may be an effect not only that changes the size, color or shape of the object, but also changes the display area or the movement of the object on the screen.

In addition, in another embodiment, the user blowing into the terminal can be used in combination with a proximity or pressure touch action. For example, the controller 180 can detect the quality of the blow signal contained in the audio signal. If the quality of the blow signal is less than a predetermined signal, the controller 180 can control the vibrating module 154 to vibrate to indicate to the user they should blow more clearly into the terminal. The vibrating module 154 can vibrate softly if the blow signal is below the predetermined signal, and then increase as the blow signal improves.

In addition, the vibrating module 154 can vibrate when the blow signal is sufficient and not vibrate when the blow signal is not sufficient. Thus, the user can get an intuitive feeling about how to produce a quality blow signal.

A similar concept applies to a pressure contact touching action. For example, when the touchscreen is a touch pad, the user can press different buttons or portions of the touch screen to input information. The user can also execute one function by pressing a button with a first pressure and execute a second function by pressing the same button with a second stronger pressure. Thus, the vibrating module can output different vibration effects to indicate the type of pressure contact input on the terminals.

In still another embodiment, the user can blow into the terminal to play a virtual instrument displayed on the display module 151. For example, if a tuba was displayed on the terminal, the user can blow into the terminal and the controller 180 plays a tuba sound. The controller 180 can also provide a visual effect on the display module 151. For example, the controller 180 can enlarge the end of the tuba as the sound is being input. The controller 180 can also display an additional text or image such as an image of musical notes.

The present invention also applies to proximity touch as described above. Thus, the controller 180 can provide visual and/or haptic effects based on an accuracy of a proximity touch pattern, etc. In another example, the mobile terminal can be attached to another device and be used to provide different visual or haptic effects. For example, the mobile terminal may be used in an "air guitar" device in which the mobile terminal is placed within the neck portion or center portion of a play guitar (e.g., a guitar configured to receive the mobile terminal). The strings of the guitar can then be visually displayed on the display module, and the user can play the guitar by pressing, touching (contact or proximity) the displayed screens. The controller 180 then displays the strings as moving when the user touches or strums them.

If the terminal is placed in a preset neck location in a play guitar, the controller 180 can display the strings in the neck portion of the guitar and can provide a visual effect by indicating a string or strings to be touched in a particular pattern for a music song. The user can then learn how to play a song on the guitar by pressing or touching the highlighted or indicated strings.

Thus, according to embodiments of the present invention, the user can conveniently input commands into the mobile terminal without operating a hard-key or soft-key equipped on the mobile terminal. Also, the user may control the mobile terminal quickly using an intuitive and simple user interface.

In addition, the mobile terminal and corresponding method of controlling the mobile terminal according to embodiments of the present invention are not restricted to the embodiments set forth herein. That is, variations and combinations of the embodiments set forth herein fall within the scope of the present invention. Further, embodiments of the present invention can be realized as codes that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and transmission through the Internet). Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    receiving a blow signal corresponding to a blowing action into a microphone of the mobile terminal, said blowing action not being a speaking action into the microphone; and
    generating at least one of a visual effect and a vibration effect on the at least one other terminal based on characteristics of the blow signal; and
    receiving an input signal corresponding to a touching of an image displayed on the at least one other terminal,
    wherein the generating step generates the visual effect on a portion of the displayed image that is touched on the at least one other terminal, and
    wherein a blow pattern is determined based on a strength of sound pressure of the blow signal, and said at least one of the visual effect and the vibration effect is varied according to the determined blow pattern.

2. The method of claim 1, further comprising:
    connecting a call with the at least one other terminal; and
    extracting the blow signal from a call signal of the at least one other terminal,
    wherein the generating step further comprises generating said at least one of the visual effect and the vibration effect on the mobile terminal based the characteristics of the extracted blow signal during the connected call.

3. The method of claim 2, wherein the vibration effect has a vibration strength that substantially matches a strength of the blowing action into the microphone of the at least one other terminal.

4. The method of claim 2, wherein the visual effect comprises:
    displaying a text or an image on a screen of the mobile terminal.

5. The method of claim 4, wherein the displaying step comprises:
    displaying the text or the image to have a misty or steamy effect.

6. The method of claim 4, wherein the generating step generates the vibration effect while displaying the text or the image on the screen of the mobile terminal.

7. The method of claim 2, further comprising:
    setting said at least one of the visual effect and the vibration effect before the blow signal is received.

8. The method of claim 7, wherein the setting step comprises:
    setting a vibration pattern corresponding to a caller or called person corresponding to the call connection between the mobile terminal and the at least one other terminal.

9. The method of claim 1, wherein the visual effect comprises:
    changing an image displayed on the at least one other terminal to correspond with the blowing action,
    wherein the image is first touched by a user of the at least one other terminal.

10. The method of claim 9, wherein the changing step comprises:
    changing the image displayed on the at least one other terminal to appear as blowing in the wind to correspond with the blowing action.

11. The method of claim 1, further comprising:
    receiving an input signal corresponding to a touching of an image displayed on the mobile terminal,
    wherein the generating step generates the visual effect on a portion of the displayed image that is touched on the mobile terminal.

12. The method of claim 2, wherein generating the visual effect comprises:
    rearranging items displayed on the mobile terminal according to the characteristics of the blow signal.

13. A mobile terminal, comprising:
    a microphone configured to receive a blow signal corresponding to a blowing action into the microphone of the mobile terminal, said blowing action not being a speaking action into the microphone;
    a wireless communication unit configured to wirelessly communicate with at least one other terminal; and
    a controller configured to generate at least one of a visual effect and a vibration effect on the at least one other terminal based on characteristics of the blow signal, and to receive an input signal corresponding to a touching of an image displayed on the at least one other terminal, wherein the controller is further configured to generate the visual effect on a portion of the displayed image that is touched on the at least one other terminal, to determine a blow pattern based on a strength of sound pressure of the blow signal, and to vary said at least one of the visual effect and the vibration effect according to the determined blow pattern.

14. The mobile terminal of claim 13, wherein the wireless communication unit is further configured to connect a call with the at least one other terminal, and wherein the controller is further configured to extract the blow signal from a call signal of the at least one other terminal, and to generate said at least one of the visual effect and the vibration effect on the mobile terminal based the characteristics of the extracted blow signal during the connected call.

15. The mobile terminal of claim 14, wherein the controller is further configured to generate the vibration effect to have a vibration strength that substantially matches a strength of the blowing action into the microphone of the at least one other terminal.

16. The mobile terminal of claim 14, further comprising:
a display unit configured to display information,
wherein the controller is further configured to generate the visual effect by controlling the display unit to display a text or an image on a screen of the mobile terminal.

17. The mobile terminal of claim 16, wherein the controller is further configured to control the display unit to display the text or the image to have a misty or steamy effect.

18. The mobile terminal of claim 16, wherein the controller is further configured to generate the vibration effect while controlling the display unit to display the text or the image on the screen of the mobile terminal.

19. The mobile terminal of claim 14, further comprising:
an input unit configured to set said at least one of the visual effect and the vibration effect before the blow signal is received.

20. The mobile terminal of claim 19, wherein the input unit is further configured to set a vibration pattern corresponding to a caller or called person corresponding to the call connection between the mobile terminal and the at least one other terminal.

21. The mobile terminal of claim 13, wherein the controller is further configured to generate the visual effect by controlling the display unit to change an image displayed on the at least one other terminal to correspond with the blowing action.

22. The mobile terminal of claim 21, wherein the controller is further configured to control the display unit to change the image displayed on the at least one other terminal to appear as blowing in the wind to correspond with the blowing action, and wherein the image is first touched by a user of the at least one other terminal.

23. The mobile terminal of claim 13, wherein the controller is further configured to receive an input signal corresponding to a touching of an image displayed on the mobile terminal, and to generate the visual effect on a portion of the displayed image that is touched on the mobile terminal.

24. The mobile terminal of claim 14, wherein the controller is further configured to generate the visual effect by rearranging items displayed on the mobile terminal according to the characteristics of the blow signal.

* * * * *